(12) United States Patent　(10) Patent No.: US 12,178,375 B1
Spitler et al.　(45) Date of Patent: Dec. 31, 2024

(54) PET CLEANING UTENSIL

(71) Applicants: Gregory Bruce Spitler, Bellbrook, OH (US); Daine P. Lutey, Dayton, OH (US)

(72) Inventors: Gregory Bruce Spitler, Bellbrook, OH (US); Daine P. Lutey, Dayton, OH (US)

(73) Assignee: Puke Scoop & Boogie LLC, Bellbrook, OH (US)

( * ) Notice: Subject to any disclaimer, the term of this patent is extended or adjusted under 35 U.S.C. 154(b) by 0 days.

(21) Appl. No.: 18/759,916

(22) Filed: Jun. 30, 2024

(51) Int. Cl.
| | | |
|---|---|---|
| *A47L 13/52* | (2006.01) | |
| *A47L 13/11* | (2006.01) | |
| *A47L 13/12* | (2006.01) | |
| *A47L 13/42* | (2006.01) | |
| *E01H 1/12* | (2006.01) | |
| *A01K 1/01* | (2006.01) | |

(52) U.S. Cl.
CPC ............... *A47L 13/52* (2013.01); *A47L 13/11* (2013.01); *A47L 13/12* (2013.01); *A47L 13/42* (2013.01); *E01H 1/1206* (2013.01); *A01K 1/0114* (2013.01)

(58) Field of Classification Search
CPC .......... A47L 13/52; A47L 13/11; A47L 13/12; A47L 13/42; E01H 1/1206; E01H 1/0114
See application file for complete search history.

(56) References Cited

U.S. PATENT DOCUMENTS

| | | | |
|---|---|---|---|
| 439,744 A * | 11/1890 | Dean et al. ............. | A47L 13/52 15/104.8 |
| 567,357 A * | 9/1896 | Parker ..................... | A47L 13/52 15/257.7 |
| 760,391 A | 5/1903 | Fuller | |
| 898,774 A * | 9/1908 | Niver ...................... | A47L 13/52 15/257.7 |
| 956,968 A * | 5/1910 | Hubert .................... | A47L 13/52 15/257.4 |
| 1,053,438 A | 1/1912 | Resch | |
| 2,763,143 A | 4/1955 | Dever | |
| 2,812,784 A | 9/1955 | Palmer | |
| 3,018,502 A * | 1/1962 | Lossius ................... | A47L 13/52 15/257.7 |
| 4,222,597 A * | 9/1980 | Willis .................... | E01H 1/1206 294/1.4 |
| 5,715,564 A | 2/1998 | Knouse | |
| 2009/0058115 A1 * | 3/2009 | Freedman .............. | A01K 1/011 294/177 |
| 2012/0080893 A1 * | 4/2012 | Bernard ............... | A01K 1/0114 294/1.3 |
| 2013/0152331 A1 * | 6/2013 | Ward ..................... | A47L 13/52 15/257.1 |
| 2019/0159423 A1 * | 5/2019 | Davids ................ | A01K 1/0114 |

* cited by examiner

*Primary Examiner* — Stephen A Vu
(74) *Attorney, Agent, or Firm* — R. William Graham

(57) ABSTRACT

A cleaning utensil suited for pet cleanup includes a scoop and a stopper removably connected to the scoop.

8 Claims, 8 Drawing Sheets

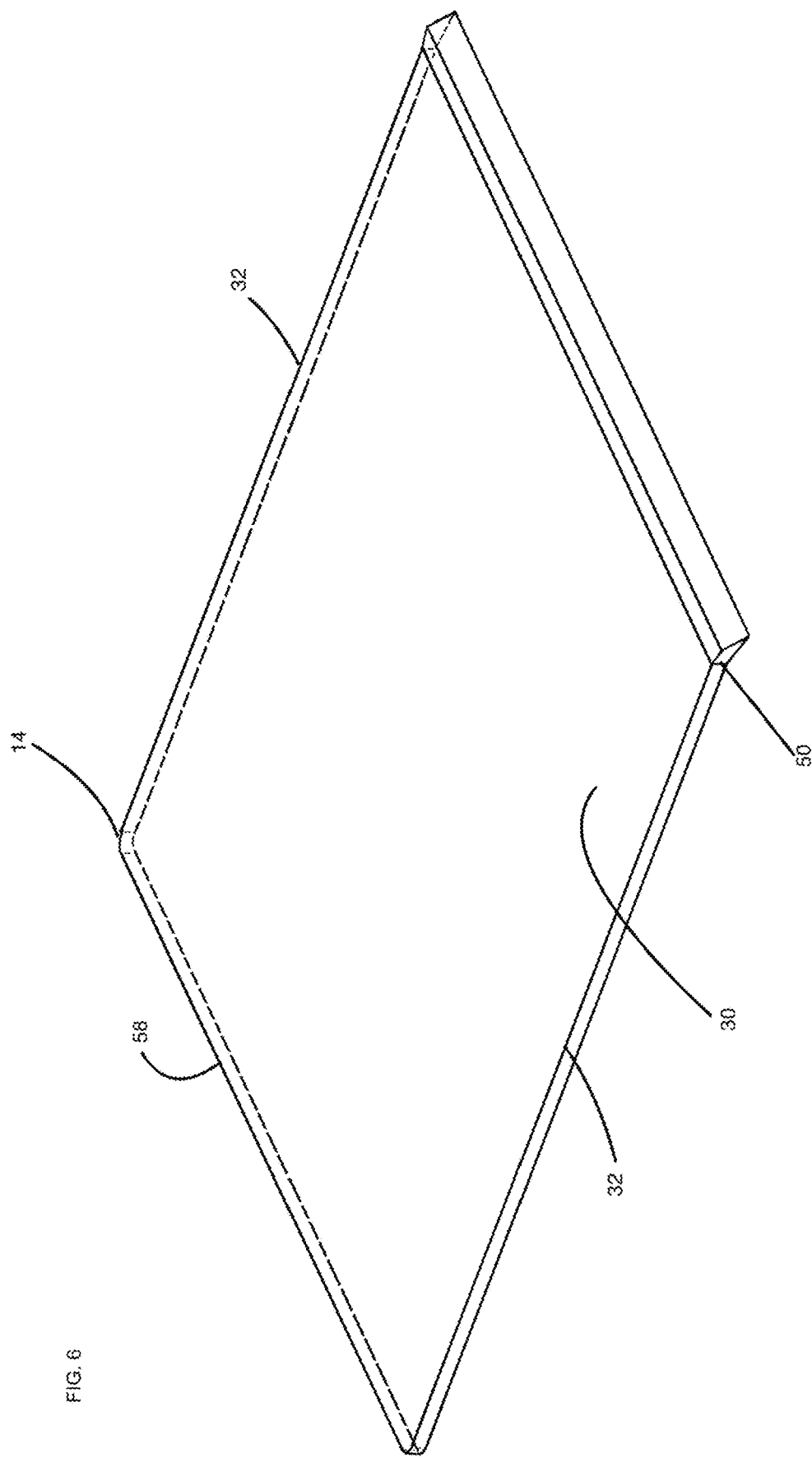

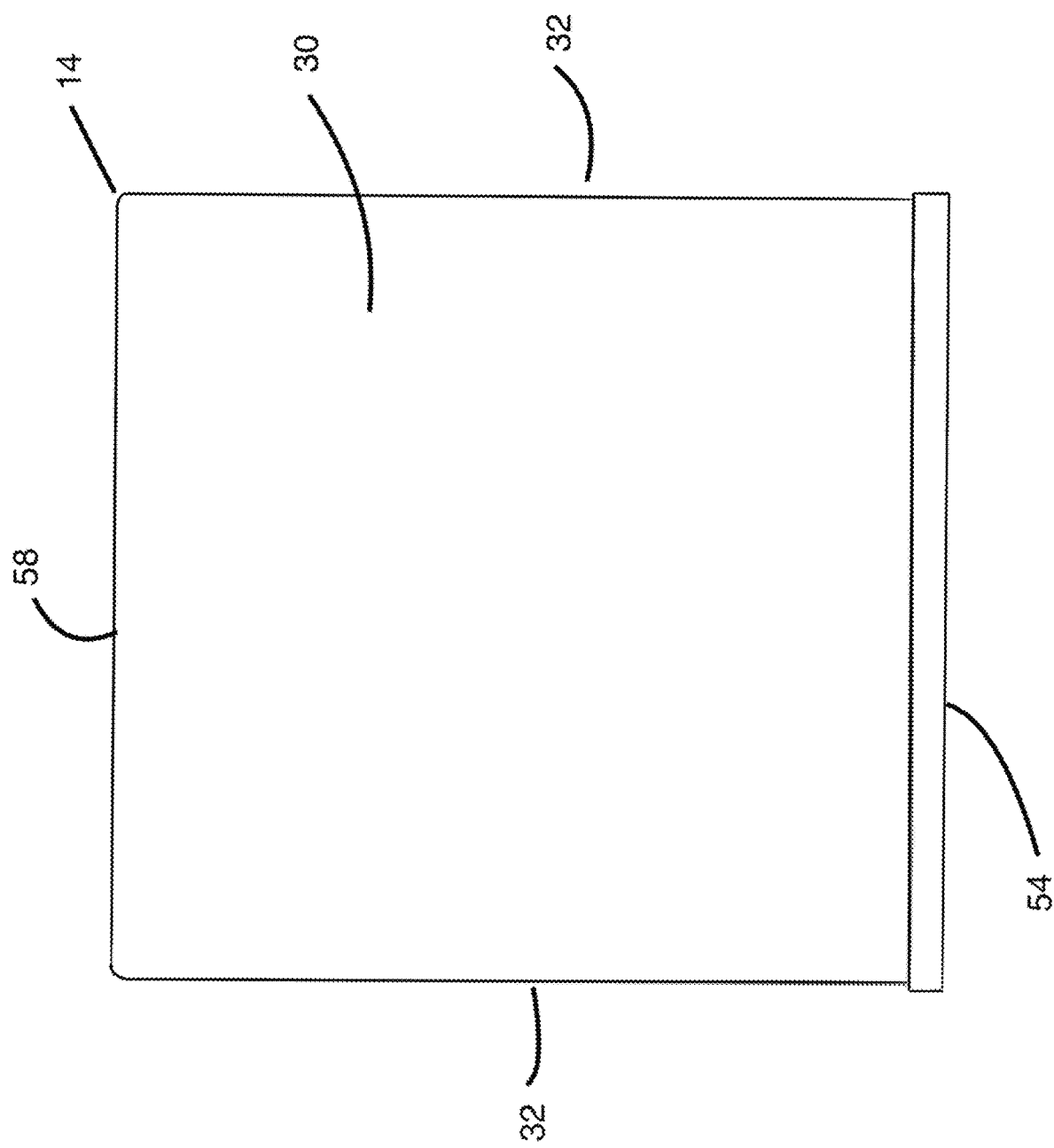

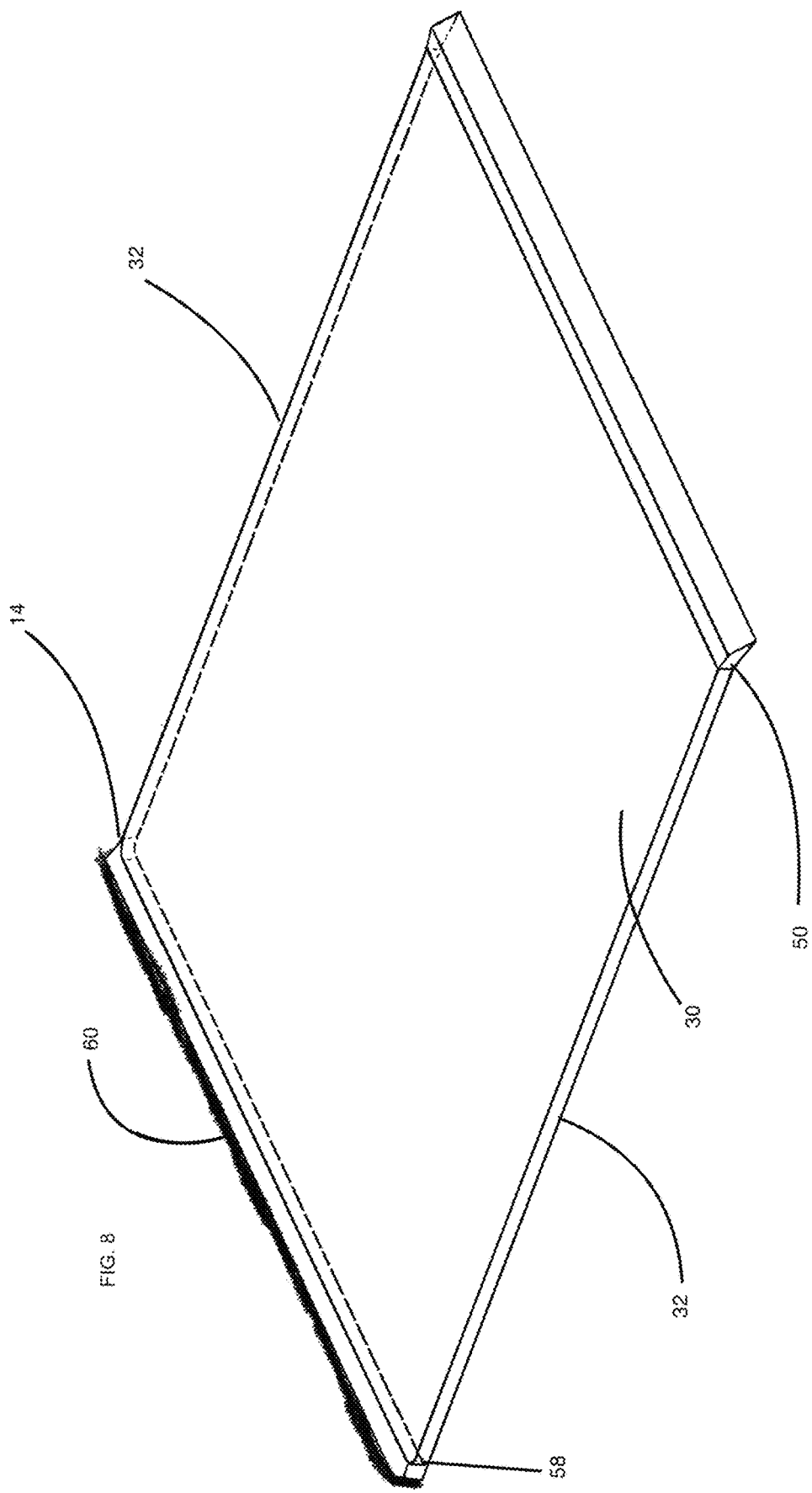

PET CLEANING UTENSIL

BACKGROUND OF THE INVENTION

The present invention pertains generally to dustpans. More particularly, the instant invention relates to a pet cleaning utensil for pet fecal material and pet throw up and which is particularly suited for use in aiding in removal from hard surface flooring as well as carpet.

PRIOR ART

Traditional dustpans include a pan having a leading edge for disposal adjacent the waste to be picked up. This waste is commonly swept onto the pan with a relatively long soft bristle of a broom or brush. In locations where a quantity of waste collects on a hard floor, for example, the waste is swept into a pile and the debris is swept into the pan.

A common type of prior dust pan uses convergent sidewalls with a handle. Other dustpans have rolled sides which tend to converge and which may serve as handles and still other dustpans have converging sidewalls and a curved bases for retaining material once swept therein.

In the case where debris is on or in carpet, this usually requires a vacuum or perhaps a carpet cleaner as a conventional dust pan alone is typically not suitable for removal of many types of pet debris, such as cat hairballs which get stuck in their stomach and not pass through their stool and pose a wet and ugly clean up problem.

Currently, in the case for cleaning up after pets, be it litter, throw up, or fecal material, the surface will dictate which cleaning implement to use. Conventional dustpan configurations are limited to hard flooring for pets and are not well suited for carpet locations wherein sweeping does not perform the job to pick up pet debris. However, it is desirable to have a utensil which can be effective in picking up such type of debris without the need to resort to a vacuum, typical dustpans have limited application for pet clean up. As such, there is a need to improve the process of cleaning up pet debris through an improved device on both hard and soft surfaces.

SUMMARY OF THE PRESENT INVENTION

It is an object to improve utensils for cleaning.

Another object is to improve cleaning utensils for cleaning debris associated with pets.

Another object is to ease cleaning up after pets on various surfaces.

Accordingly, the present invention is directed to a cleaning utensil, particularly well suited for cleaning pet debris on hard and soft surfaces. The scoop includes a bottom panel having upwardly extending side walls connected thereto and an upwardly extending rear wall connected thereto which interconnects the side walls. Each side wall has inwardly extending detents which serve as a catch for a stopper until released by lifting with one's hand.

A wire frame is provided having a handle connected to a pair of lateral spaced arms forming a fork configuration. The arms are spaced apart to receive the side walls and are connected, preferably fixed, to the side walls.

The stopper includes a panel, preferably, a rigid or semi-rigid panel, having a two lateral spaced edges spanning a width between the side walls and the panel is of a thickness to be received between the detents and frictionally held in position. A stepped curved section in the wire frame can be provided interconnecting the handle and the arms and can be aesthetically configured, for example, as an animal's rear, such that when viewed with the handle provides the appearance of a tail end of an animal. The wire frame's handle may also serve as a hanger for the utensil.

The panel can include a leading or forward edge which can preferably include a rubber or thermoplastic squeegee member can be removably connected thereto. In this regard, the leading edge can be configured with a lip and the squeegee member can have a longitudinal complementary shaped recess to frictionally receive and be retained on the leading edge of the panel. Optionally, a trailing edge of the panel can be configured with a brush head spanning an approximate length of the trailing edge.

The utensil may be formed of various materials. A preferred material for the scoop and wire frame can be stainless steel, aluminum, or a metal which is deemed highly suitable for the particular use. It is contemplated that a molded plastic could be one or more part of the invention.

BRIEF DESCRIPTION OF THE DRAWINGS

FIG. 6 is a perspective of a stopper of the invention.

FIG. 7 is a top view of the stopper of FIG. 6.

FIG. 8 is a perspective of another embodiment of the stopper of the invention.

DETAILED DESCRIPTION OF PREFERRED EMBODIMENT

Figure 1:
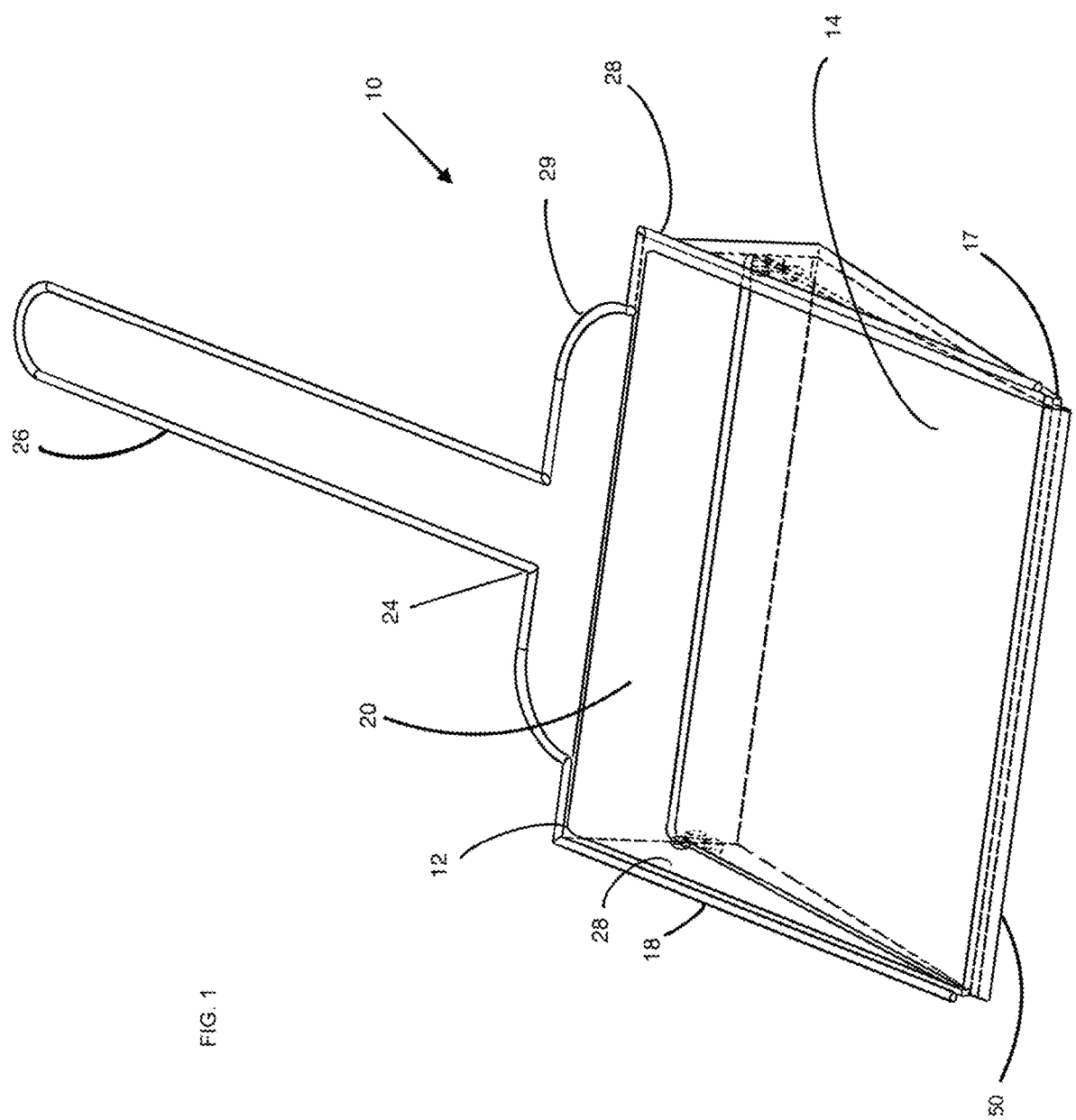
FIG. 1 is a front perspective view of the present cleaning utensil.
Figure 2:
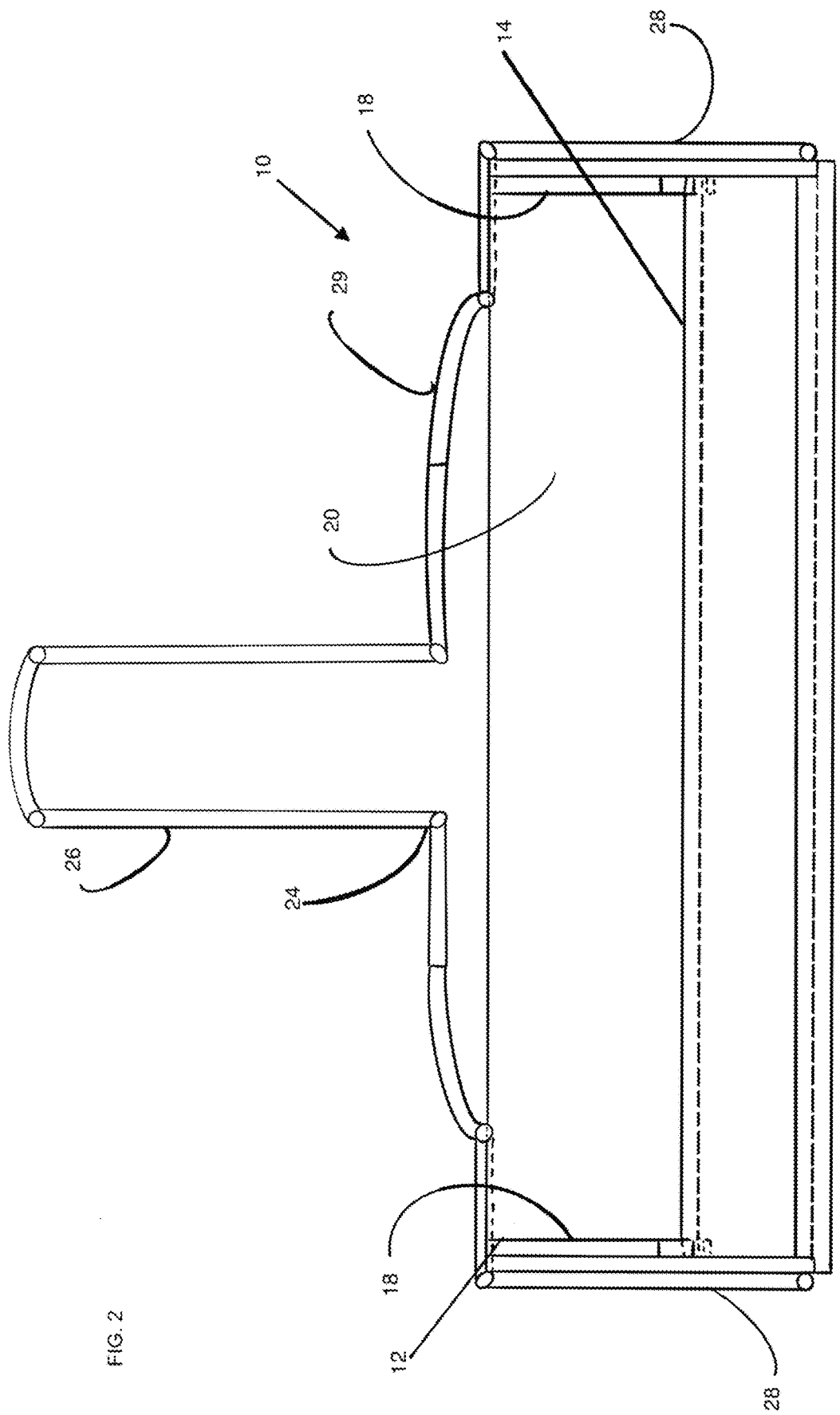
FIG. 2 is a front view of a cleaning utensil of the instant invention.
Figure 3:
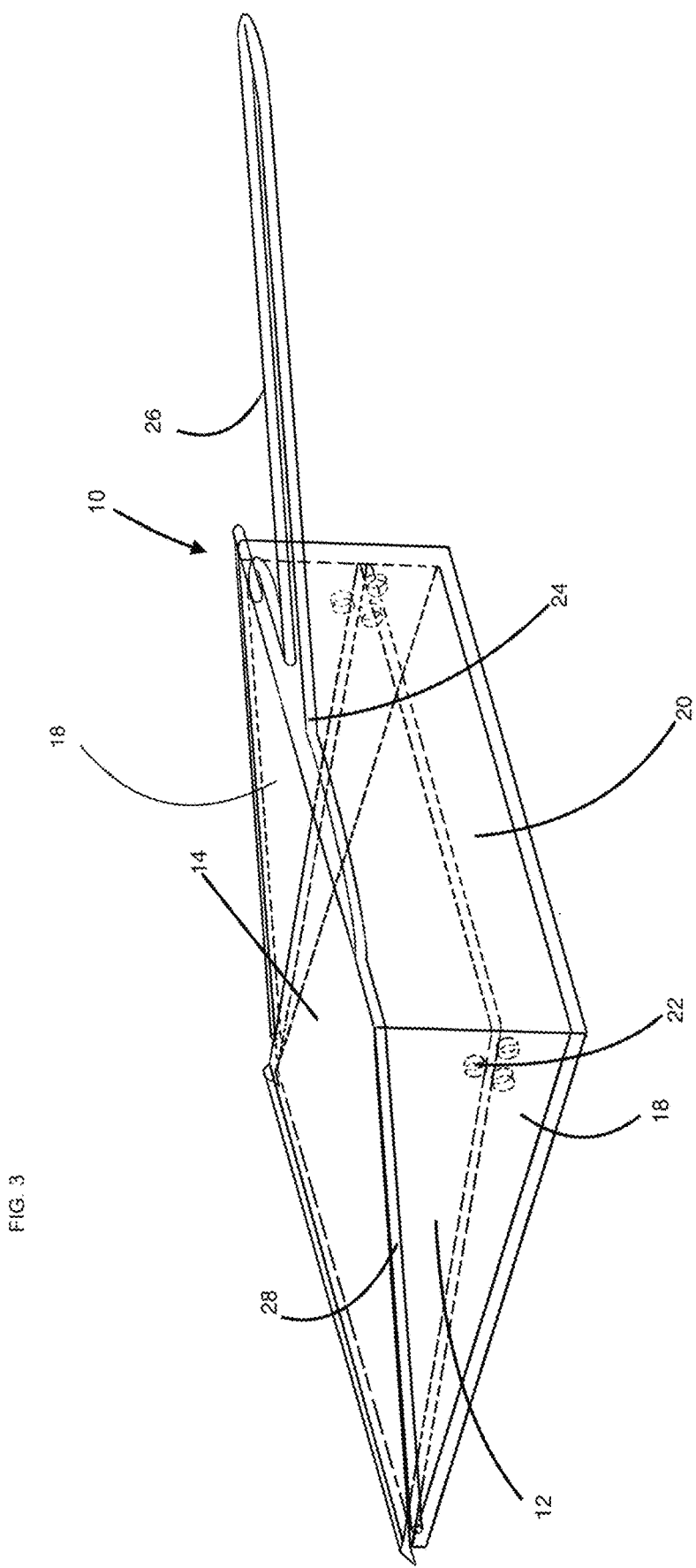
FIG. 3 is a side back perspective view of the cleaning utensil.
Figure 4:
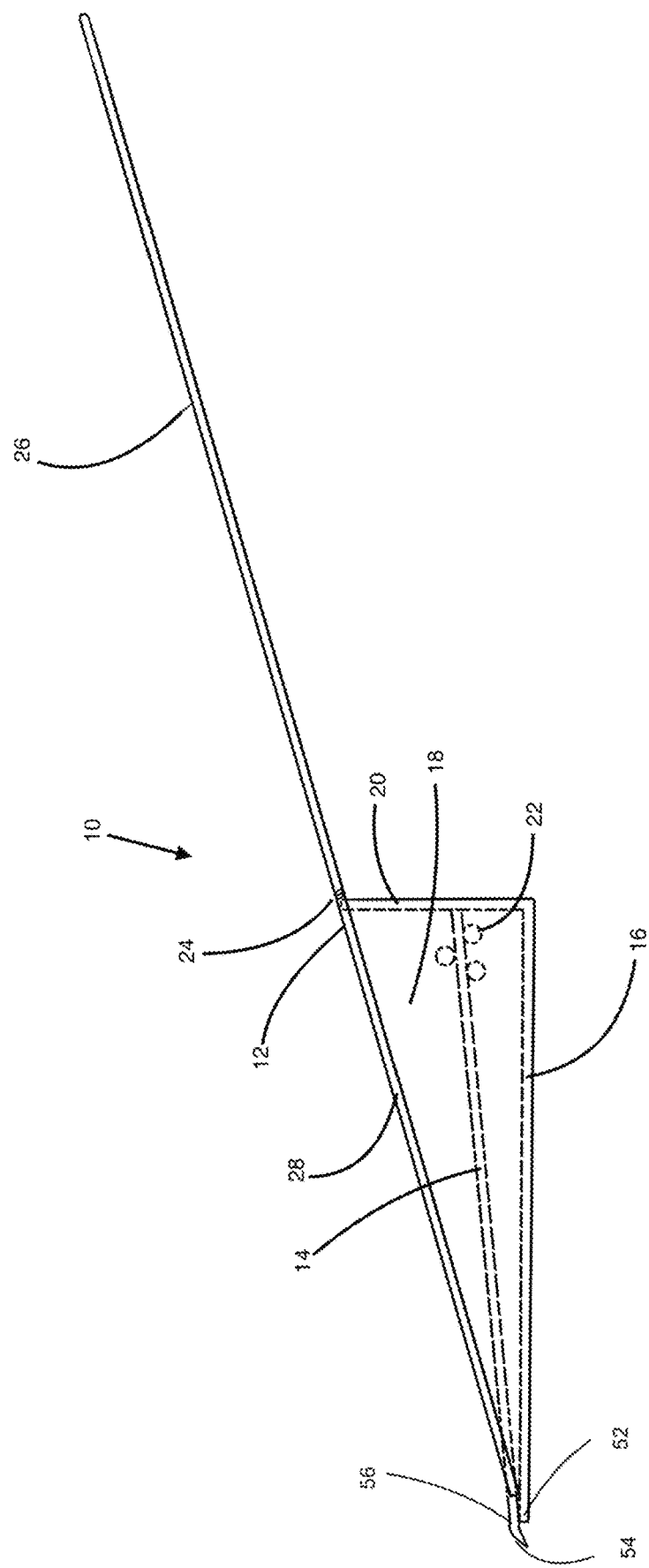
FIG. 4 is a side view of the utensil of the invention.
Figure 5:
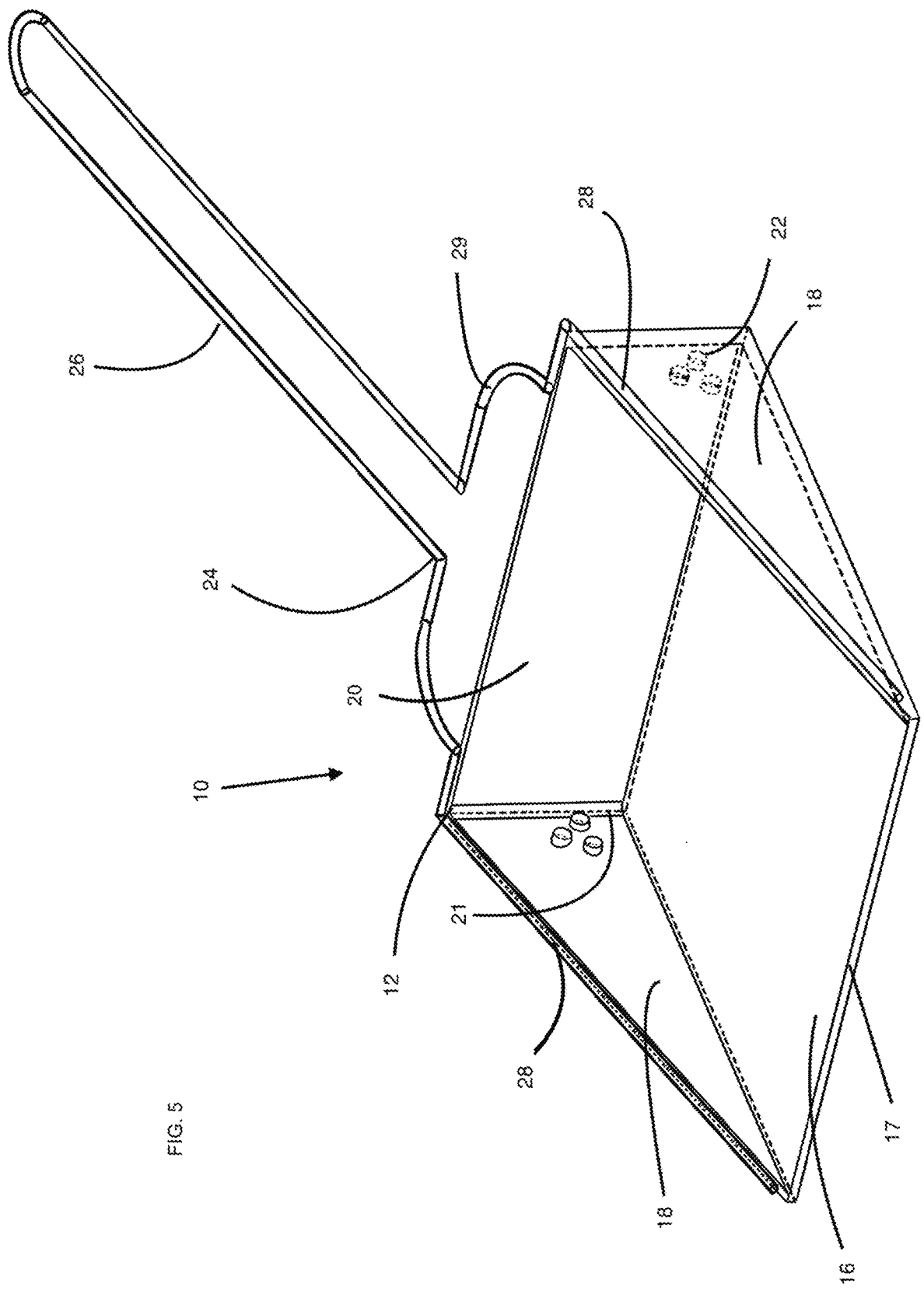
FIG. 5 is a front perspective of a scoop of the invention.

Referring now to the drawings, wherein applied reference numerals indicate parts similarly hereinafter identified, the reference numeral 10 is generally designating a cleaning utensil and includes a scoop 12 and a stopper 14 of the invention which is particularly well suited for pet cleanup.

The scoop 12 includes a bottom panel 16 having upwardly extending side walls 18 connected thereto and an upwardly extending rear wall 20 connected to the bottom panel 16 interconnecting the side walls 18. The bottom panel 16, side walls 18, and rear wall 20 can be curved their juncture to ease debris removal. Each side wall 18 has inwardly extending detents 22 which serve as a catch for a stopper 14 to prevent movement of the stopper 14 until released.

A wire frame 24 is provided having a handle 26 connected to a pair of lateral spaced arms 28 forming a fork configuration wherein the arms 28 are spaced enough apart to receive the side walls 18 and are connected, for example, preferably fixed to the side walls 18. The stopper 14 includes a panel 30, preferably rigid or semi-rigid panel, having a two lateral spaced edges 32 spanning a width between the side walls 18 and wherein the panel 30 is of a thickness to be received between the detents 20 and frictionally held in selected position.

A stepped curved section 40 can be optionally provided interconnecting the handle 26 and the arms 28 and can be aesthetically configured, for example, as an animal's rear, such that when viewed with the handle 26 provides the appearance of a tail end of an animal. The handle 26 of the wire frame 24 may also serve as a hanger for the scoop 12.

The panel 30 can include a leading or forward edge 50 which can preferably include a rubber or thermoplastic squeegee member 52 which is connected to the leading edge 50. In this regard, the leading edge 50 can be configured with a lengthwise lip 54 and the squeegee member 52 can have a longitudinal complementary shaped recess 56 to frictionally receive and be retained on the leading edge 50 of the panel. Optionally, a trailing edge 58 of the panel 30 can be configured with a brush head 60 spanning an approximate length of the trailing edge 58. The panel 30 could be reversed in orientation to permit either the squeegee member 52 or brush head 60 to be oriented out front.

The scoop 12 and stopper 14 may be formed of various materials. A preferred material for the scoop 12 and wire frame 24 can be stainless steel or aluminum construction to perform best for the particular use. It is contemplated that a molded plastic could be one or more part of the invention, for example, the squeegee member 52 or brush head 58.

The side walls 18 can be tapered as seen in the figures with a maximum height of about 1.5-2 inches, preferably, 1 and ⅝$^{th}$ inch, for example and the rear wall 20 can be of the same height. A length wire frame 24 can be about 12 to 13 inches, for example, and the width of the scoop 12 can be about 5 inches.

The instant invention provides an improved utensil which enables the removal of debris commonly associated with pets, such as cats and dogs. This can include throw-up, litter, fecal material, for example, which occurs on both hard floor surfaces and carpet. The stopper 14 provide a unique aspect which is cleverly maintained in the scoop 12 by way of detents 20. One can remove the stopper 14 when the pet either throws up or defecates, for example, and depending on the floor surface use the appropriate edge to aid in removal, such as the squeegee member 52 or brush 58.

While I have shown but one embodiment of the invention, it will be apparent to those skilled in the art that the invention may be embodied still otherwise without departing from the spirit and scope of the invention.

What is claimed is:

1. A cleaning utensil suited for pet cleanup, which includes:

scoop having a bottom panel, having a back edge, side edges, and a leading edge, upwardly extending side walls connected to said side edges and an upwardly extending rear wall connected to said back edge and interconnecting said side walls, each said side wall having an inwardly extending detent surface; and a stopper which includes a panel having a trailing edge, a leading forward edge, a-two lateral spaced edges spanning a width between said upwardly extending side walls and wherein said panel is of a thickness to be removably received between said detent surface in a manner to be frictionally held in position by said detent surface and when so held, said trailing edge is disposed adjacent said upwardly extending rear wall and said leading forward edge extends beyond said leading edge of said bottom panel to readily permit manual grasping of said leading forward edge for separation and removal of said stopper from said scoop.

2. The cleaning utensil of claim 1, wherein said panel is one of a rigid and semi-rigid material.

3. The cleaning utensil of claim 1, which includes a wire frame having an inverted U-shape portion forming a handle which are spaced and connected to a pair of lateral spaced arms forming a fork configuration, wherein said arms are spaced apart to receive and connect to said side walls.

4. The cleaning utensil of claim 3, wherein said wire frame is fixed to said said scoop.

5. The cleaning utensil of claim 3, wherein said wire frame has a stepped curved section interconnecting said handle and said arms configured to be as an animal's rear end with said handle providing an appearance of a tail.

6. The cleaning utensil of claim 1, wherein said leading forward edge ich-includes squeegee member connected thereto.

7. The cleaning utensil of claim 6, wherein said leading forward edge is configured with a lip and said squeegee member has a longitudinal complementary shaped recess to frictionally receive and be retained on said leading edge.

8. The cleaning utensil of claim 1, wherein said trailing edge is configured with a brush head spanning a length of said trailing edge.

* * * * *